United States Patent [19]
Ro et al.

[11] Patent Number: 5,768,249
[45] Date of Patent: Jun. 16, 1998

[54] DAMPER FOR AN OPTICAL DISK DRIVE

[75] Inventors: Dae-sung Ro, Anyang; Young-pyo Lee, Kyungki-Do; Hae-in Shin, Suwon, all of Rep. of Korea

[73] Assignee: Samsung Electronics Co., Ltd., Kyungki-Do, Rep. of Korea

[21] Appl. No.: 731,004

[22] Filed: Oct. 9, 1996

[30] Foreign Application Priority Data

Dec. 15, 1995 [KR] Rep. of Korea .............. 95-50672

[51] Int. Cl.$^6$ ............................................. G11B 33/08
[52] U.S. Cl. ............................. 369/263; 360/97.02
[58] Field of Search ........................ 369/263; 360/97.01, 360/97.02, 97.03, 97.04, 98.01, 99.08

[56] References Cited

U.S. PATENT DOCUMENTS

| | | | |
|---|---|---|---|
| 4,442,367 | 4/1984 | Suzuki | 310/91 |
| 4,985,884 | 1/1991 | Watanabe et al. | 369/263 |
| 5,323,885 | 6/1994 | Fukunaga et al. | 369/263 |
| 5,347,507 | 9/1994 | Kuhn | 369/263 |
| 5,366,200 | 11/1994 | Scura | 360/97.02 |
| 5,379,990 | 1/1995 | Ando et al. | 267/34 |
| 5,469,311 | 11/1995 | Nishida et al. | 360/97.02 |
| 5,491,608 | 2/1996 | Koyanagi et al. | 361/685 |
| 5,559,649 | 9/1996 | Ito et al. | 360/99.06 |

FOREIGN PATENT DOCUMENTS

| | | |
|---|---|---|
| 0 176 602 | 4/1986 | European Pat. Off. . |
| 0 665 544 | 8/1995 | European Pat. Off. . |
| 2 166 585 | 5/1986 | United Kingdom . |
| WO 91/00967 | 1/1991 | WIPO . |

*Primary Examiner*—Jefferson Evans
*Attorney, Agent, or Firm*—Sughrue, Mion, Zinn, Macpeak & Seas, PLLC

[57] ABSTRACT

A damper for an optical disk drive connected between a frame and a base on which a turntable is rotatably installed, for damping vibrations transmitted to the turntable. The damper has a vertical absorption space for absorbing vertical vibration, a horizontal absorption space for absorbing horizontal vibration, and a plurality of protrusions for connecting the damper to the frame and the base. The damper is connected by inserting the protrusions of the damper into connection openings of the frame and the base.

15 Claims, 4 Drawing Sheets

DAMPER FOR AN OPTICAL DISK DRIVE

BACKGROUND OF THE INVENTION

1. Field of the Invention

The present invention relates to a damper for an optical disk drive, and more particularly, to a damper for an optical disk drive for effectively absorbing vibration of an optical pickup unit.

2. Description of the Related Art

Generally, an optical disk drive, e.g., a laser disk player (LDP) or a compact disk player (CDP), includes an optical system for emitting a beam of light to an optical disk and detecting reflected light, a drive system for rotating the optical disk and moving the optical system, and a signal processing system for processing a signal generated in response to the reflected light.

The optical disk typically rotates at 200–500 RPM, which is very fast compared to that of vinyl records (LP) which rotate at 33⅓ RPM. In an optical disc player, only the edge around a disk center hole, where information is not recorded, is clamped on a small turntable connected directly to a spindle motor shaft. Thus, the rotation of the optical disk is sensitive to vibrations or shock imparted to the disk player.

The center of rotation of the optical disk may not coincide with that of the spindle motor shaft due to imprecise machining of the center hole of the optical disk and errors occurring when the optical disk is mounted on the turntable. Further, the optical disk itself is not always a true circle.

Off-center rotation combined with vibrations to the optical disk drive may lead to data reading errors, skipping, and data writing errors of the optical pickup unit. Accordingly, the optical disk uses dampers installed between the frame and the base where the turntable is installed to absorb vibration.

FIGS. 1 and 2 show schematic diagrams of an optical disk drive in which a plurality of dampers 11 are connected between a frame 13 of the drive and a base 14 mounted on the upper side of the frame 13, and on which a turntable 16 is installed, by screws 12. In FIG. 1, reference numeral 17 denotes an optical pickup unit.

Referring to FIG. 3, the conventional damper 11 has a space 11a for absorbing vibration. When shock or vibration is transmitted to the disk drive, the damper 11 elastically deforms to the extent to which the space 11a allows in the vertical direction. Since vibrations transmitted to the disk drive are absorbed by the space 11a of the damper 11, the vibration transmitted to the turntable 16, where an optical disk (not shown) is seated, is reduced. Accordingly, errors of the optical pickup unit 17 (in FIG. 1) can be reduced or prevented.

However, since the above-mentioned conventional dampers 11 are connected by the screws 12, respectively, it is difficult to maintain precision in the assembly process. When the screws 12 cannot connect accurately in the vertical direction or when the screws 12 are tightened excessively, the space 11a is not of the proper proportions and thus the dampers 11 do not have the proper elasticity, which results in a deterioration of vibration damping. Also, when the screws 12 are not sufficiently tightened, the base 14 is not horizontal, which results in a deterioration of the optical disk drive performance. Also, the dampers 11 can damp vertical vibration, but cannot damp horizontal vibration. Thus, the optical disk drive must be kept in a horizontal orientation for optimal performance.

SUMMARY OF THE INVENTION

Accordingly, it is an object of the present invention to provide a damper for an optical disk drive in which both vertical and horizontal vibration is damped and assembly is simple.

To accomplish the above object, a damper for an optical disk drive is connected between a frame and a base on which a turntable is rotatably installed, for damping vibration transmitted to the turntable. The damper is provided with a vertical absorption space for absorbing vertical vibration, and a horizontal absorption space for absorbing horizontal vibration.

It is preferable that the damper is provided with a plurality of protrusions for connecting the damper to the frame and the base, each of the frame and the base is formed with a plurality of connection openings corresponding to the protrusions, and the protrusions are inserted elastically into the connection openings.

Preferably, each of the protrusions is formed with a locking end, and the damper is coupled with the frame and the base by insertion of the locking end into each of the connection openings.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 1:
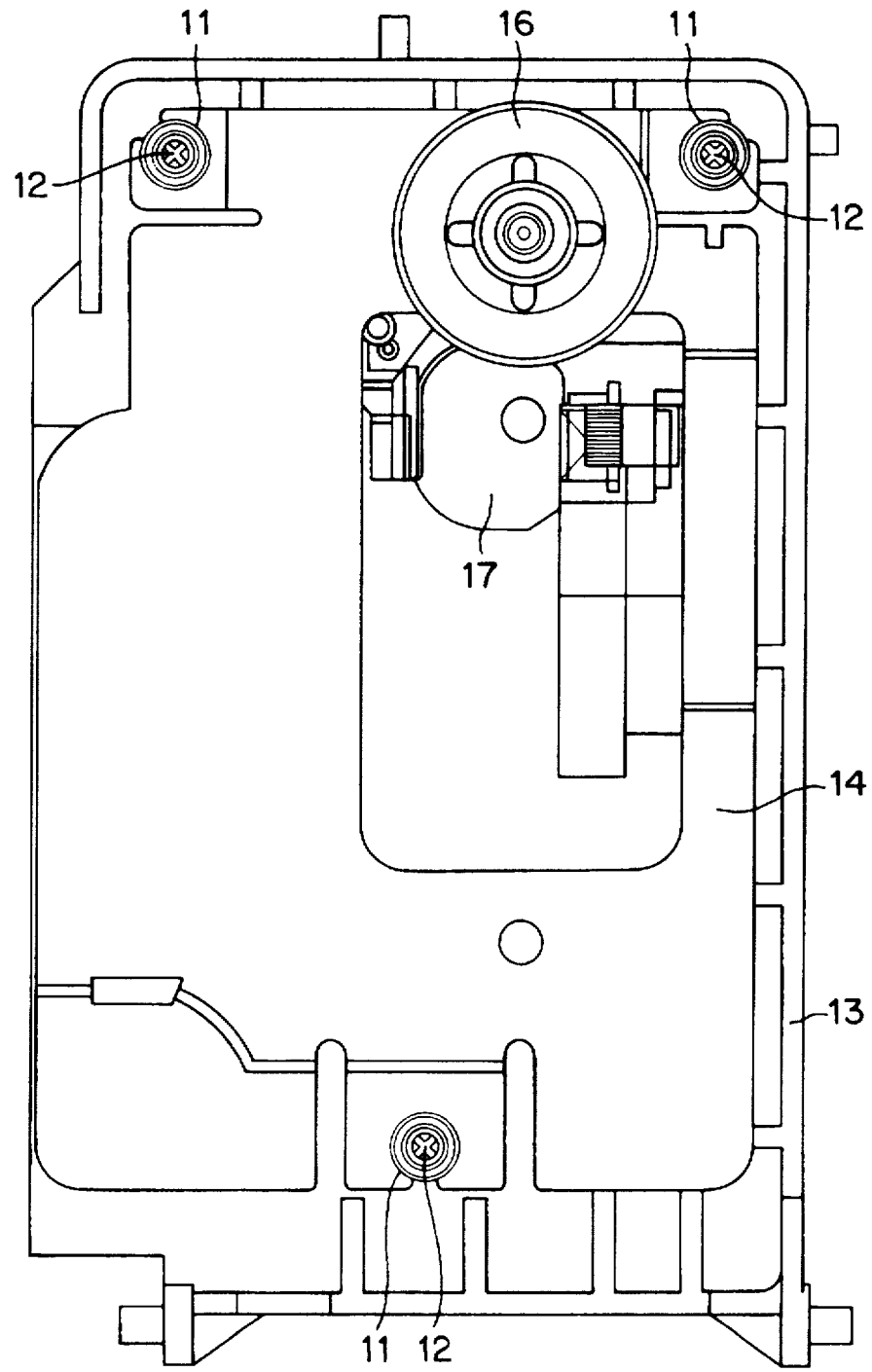
FIG. 1 is a plan view of an optical disk drive having a conventional damper.
Figure 2:
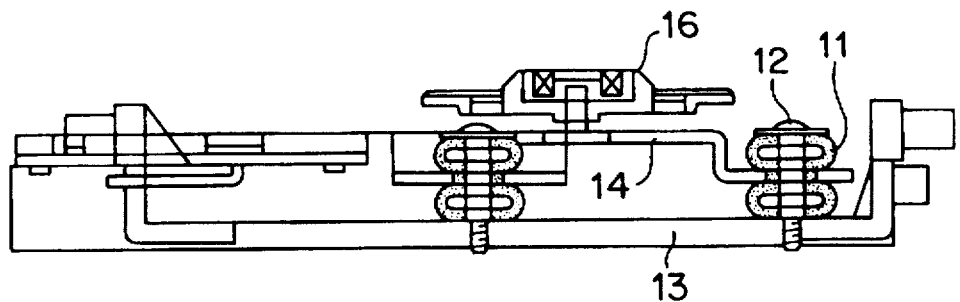
FIG. 2 is a side view of the optical disk drive of FIG. 1.
Figure 3:
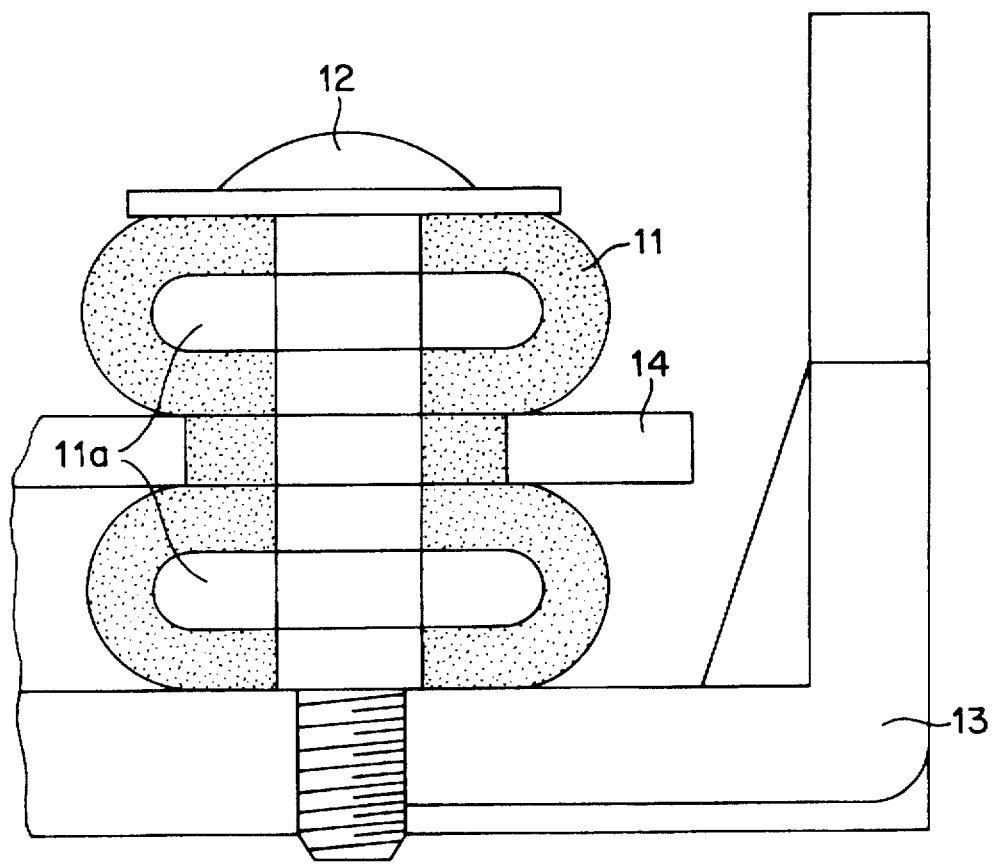
FIG. 3 is an enlarged view of the conventional damper in FIG. 2.
Figure 4:
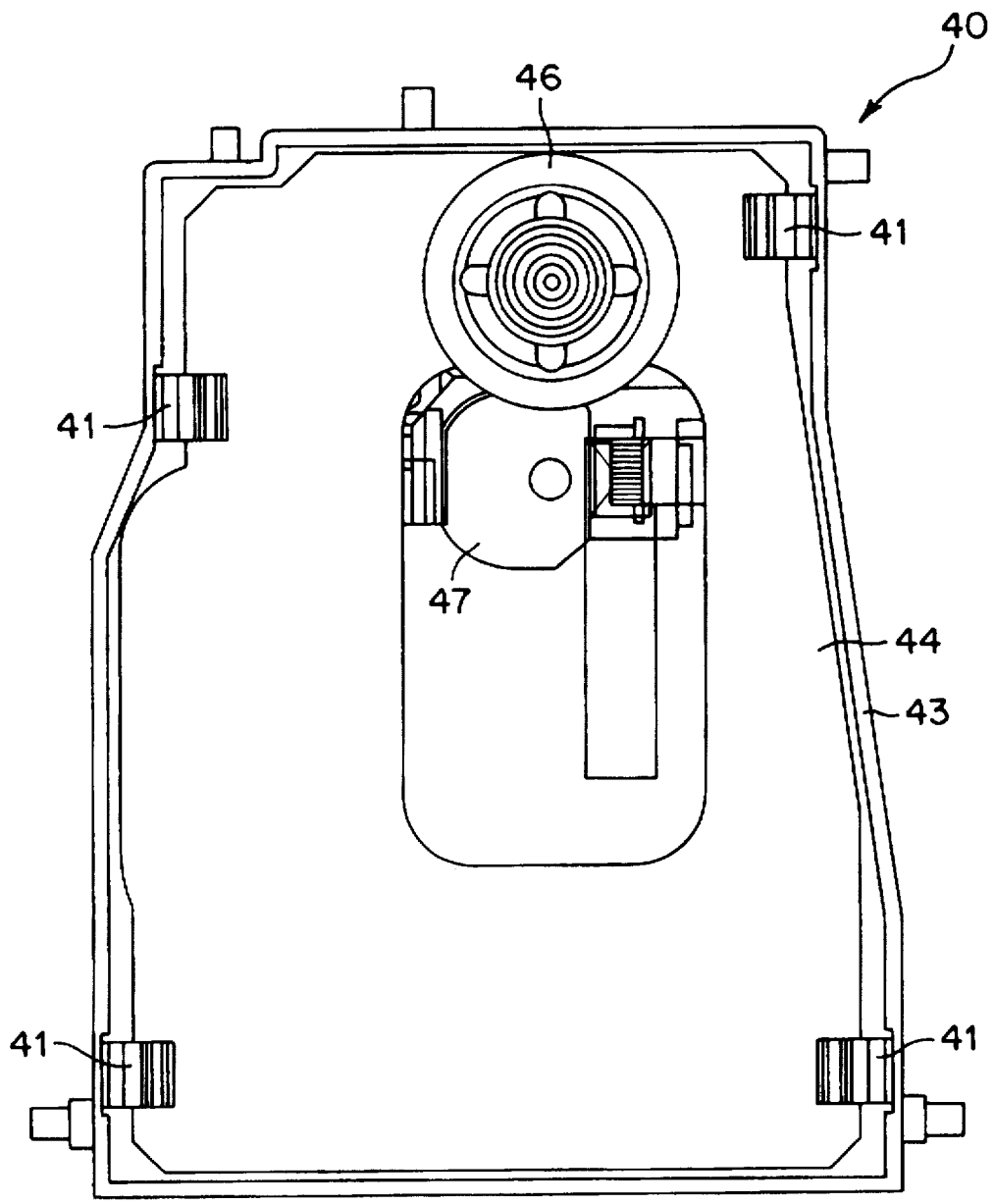
FIG. 4 is a plan view of an optical disk drive having a damper according to a preferred embodiment of the present invention.
Figure 5:
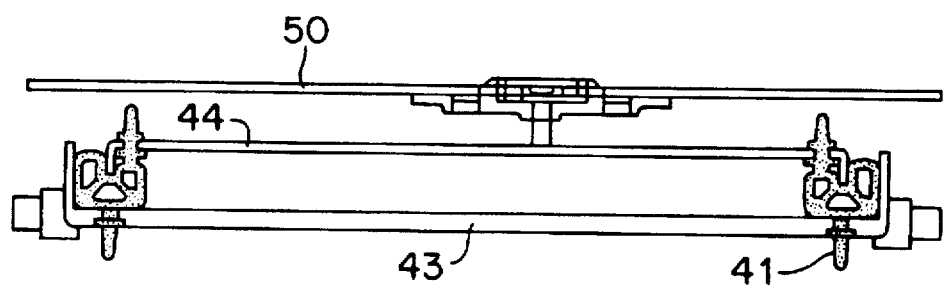
FIG. 5 is a side view of the optical disk drive of FIG. 4.

Referring to FIGS. 4 and 5, a plurality of dampers 41 for absorbing vibration are installed between a frame 43 of an optical disk drive 40 and a base 44 mounted on the upper side of the frame 43, and on which a turntable 46 is disposed.

Figure 6:
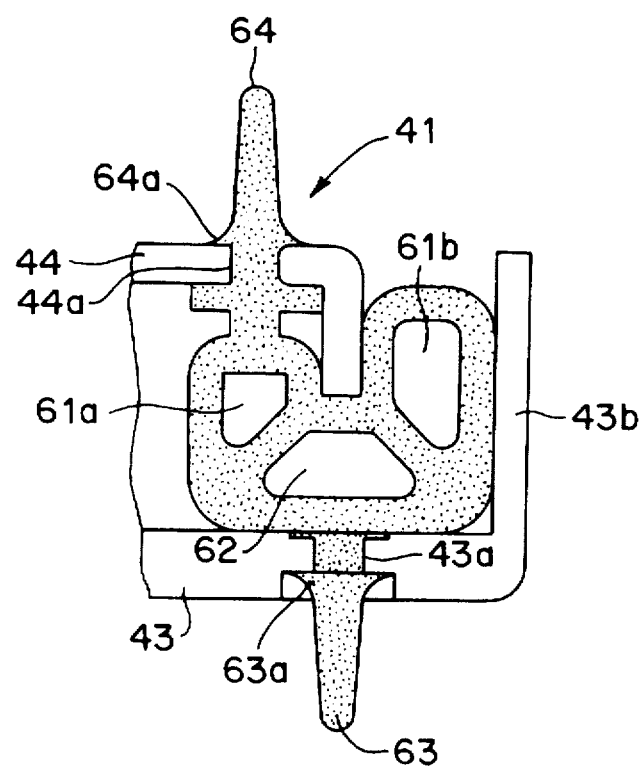
FIG. 6 is an enlarged view of the damper illustrated in FIG. 4.

Referring to FIG. 6, the inside of the damper 41 according to the preferred embodiment of the present invention is provided with vertical absorption spaces 61a and 61b for absorbing vertical vibration and a horizontal absorption space 62 for absorbing horizontal vibration. The absorption spaces are defined by a plurality of thin leg portions. Protrusions 63 and 64 connected to the frame 43 and the base 44, respectively, are formed on a lower portion and an upper portion of the damper 41, respectively. The protrusions 63 and 64 are inserted elastically into connection openings 43a and 44a formed on the frame 43 and the base 44, respectively.

Since the damper 41 can be formed of various elastic materials, such as rubber or polyurethane, locking ends 63a and 64a of the protrusions 63 and 64 contract as the locking ends 63a and 64a pass through the connection openings 43a and 44a and then expand again, thereby fixing the damper 41 to the frame 43 and the base 44. One side of the damper 41 abuts a sidewall 43b of the frame 43 and a central portion of the damper 41 has a recess which receives a side portion of base 44.

When vertical shock or vibration is transmitted to the optical disk drive having the damper 41, the damper 41 deforms elastically in the vertical direction to the extent allowed by the vertical absorption spaces 61a and 61b, thereby damping the vertical shock or vibration. When horizontal shock or vibration is transmitted through the sides of the frame 43, the damper 41 deforms elastically in the horizontal direction to the extent allowed by the horizontal absorption space 62 of the damper 41 allow, thereby damping the horizontal shock or vibration. As a result, horizontal and/or vertical vibration imparted to the turntable 46 (FIG. 4) where an optical disk 50 (FIG. 5) is placed is minimized, to thereby prevent errors of an optical pickup unit 47 (FIG. 4).

According to the present invention, since the damper can effectively absorb horizontal and vertical vibrations, the optical disk drive can operate in a horizontal or vertical direction. Also, the damper enables protrusions to be inserted into connection openings of the frame and the base without screws, which permits simple assembly and enhanced productivity.

It should be understood that the invention is not limited to the illustrated embodiment and many changes and modifications can be made without departing from the scope of the invention as defined by the appended claims.

What is claimed is:

1. A damper for an optical disk drive, connected between a frame and a base on which a turntable is rotatably installed, for damping vibrations transmitted to the turntable, said damper comprising:

a vertical absorption space for absorbing vertical vibration, and a horizontal absorption space for absorbing horizontal vibration, wherein deformable thin leg portions of said damper define each of said vertical absorption space and horizontal absorption space as void spaces and separate said vertical absorption space from said horizontal absorption space.

2. A damper for an optical disk drive according to claim 1, wherein said damper further comprises:

a plurality of protrusions for connecting said damper to said frame and said base, and said protrusions are adapted to be received in connection openings formed in the base and the frame.

3. A damper for an optical disk drive according to claim 2, wherein said damper is formed from one of rubber and polyurethane.

4. A damper for an optical disk drive according to claim 2, wherein each of said protrusions is formed with a flexible locking end that is wider than the connection openings and that is adapted for insertion into respective connection openings.

5. A damper for an optical disk drive according to claim 4, wherein said damper is formed from one of rubber and polyurethane.

6. A damper for an optical disk drive according to claim 4, further comprising an outer abutment surface that is adapted to abut a portion of the frame and an inner abutment surface that is adapted to abut a portion of the base.

7. A damper for an optical disk drive according to claim 6, wherein said inner abutment surface is defined by a recess formed in a central portion of said damper to accommodate the base.

8. A an optical disk drive comprising:

a frame;

a base on which a turntable is rotatably installed; and a damper disposed between the frame and the base for damping vibrations transmitted to the turntable, said damper compring a vertical absorption space for absorbing vertical vibration, and a horizontal absorption space for absorbing horizontal vibration, wherein deformable thin leg portions of said damper define each of said vertical absorption space and said horizontal absorption space as void spaces and separate said vertical absorption space from said horizontal absorption space.

9. An optical disk drive according to claim 8, wherein said damper further comprises:

a plurality of protrusions for connecting said damper to said frame and said base, and said protrusions being received in connection openings formed in the base and the frame.

10. An optical disk drive according to claim 9, wherein said damper is formed from one of rubber and polyurethane.

11. An optical disk drive according to claim 9, wherein each of said protrusions is formed with a flexible locking end that is wider than the connection openings and that is adapted for insertion into respective connection openings.

12. An optical disk drive according to claim 11, wherein said damper is formed from one of rubber and polyurethane.

13. An optical disk drive according to claim 11, said damper further comprising an outer abutment surface that is adapted to abut a portion of the frame and an inner abutment surface that is adapted to abut a portion of the base.

14. An optical disk drive according to claim 13, wherein said inner abutment surface is defined by a recess formed in a central portion of said damper to accommodate said base.

15. A damper for a drive apparatus, connected between a frame and a base on which a turntable is rotatably installed, for damping vibrations transmitted to the turntable, said damper comprising:

a vertical absorption space for absorbing vertical vibration, and a horizontal space for absorbing horizontal vibration, wherein the frame and base each have respective main planar surfaces and respective side walls that are perpendicular to the respective planar surfaces, and wherein said damper abuts the base along a lateral side wall of the base, and wherein said damper abuts the frame along a lateral side wall of the frame and along a planar surface of the frame.

* * * * *